Patented Feb. 18, 1936

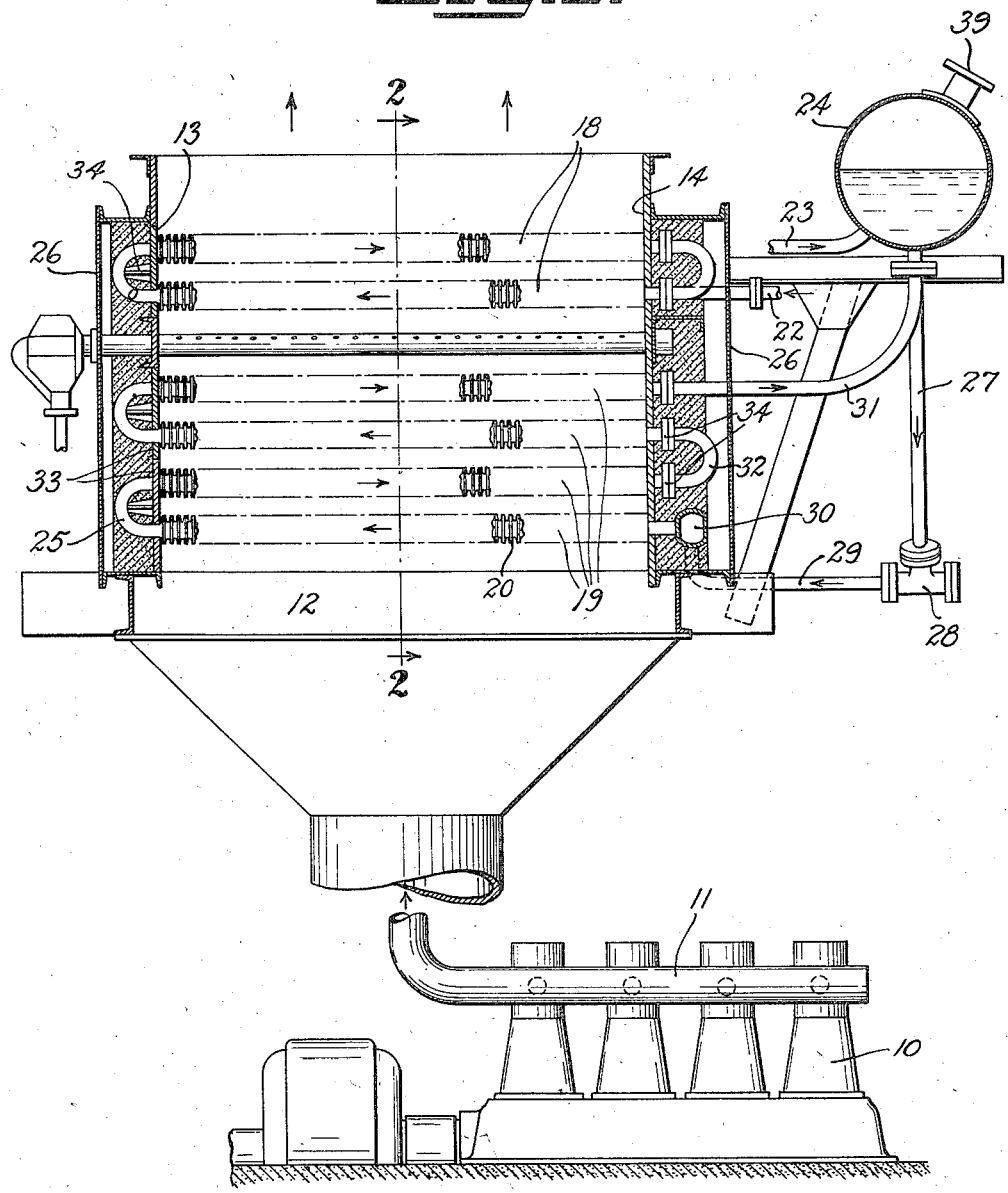

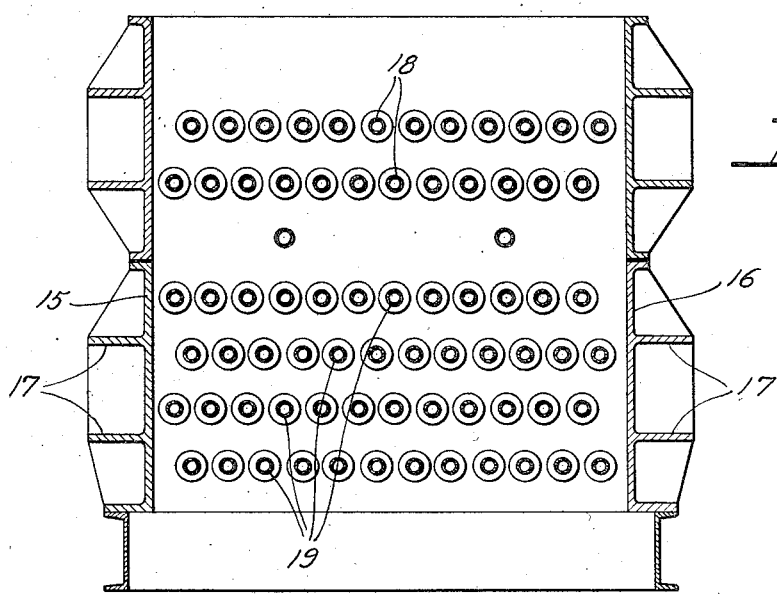
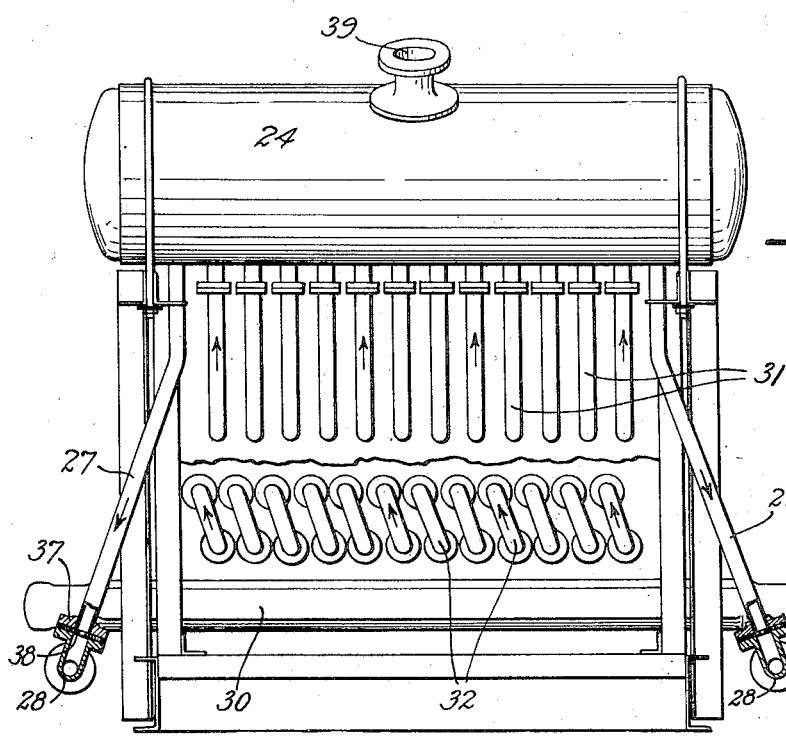

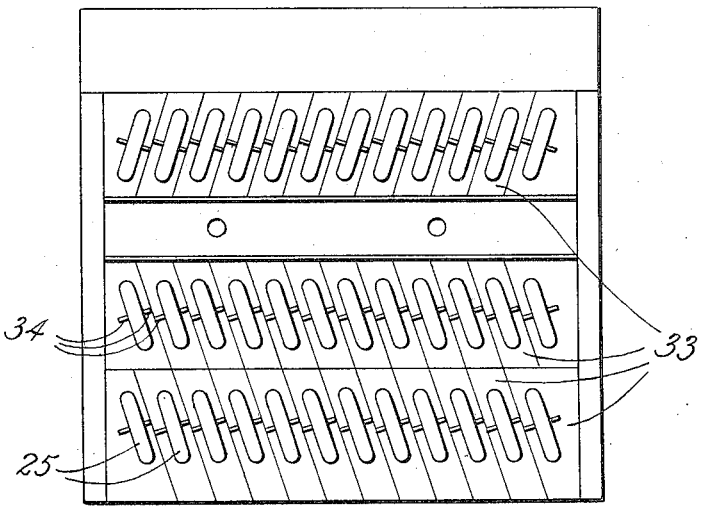
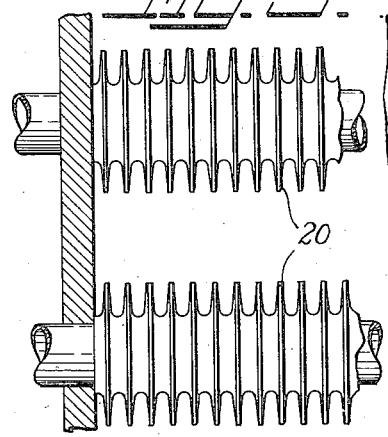
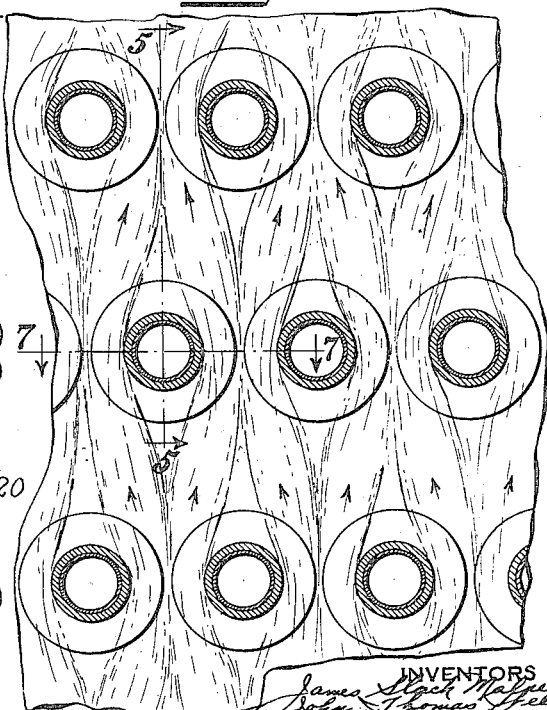
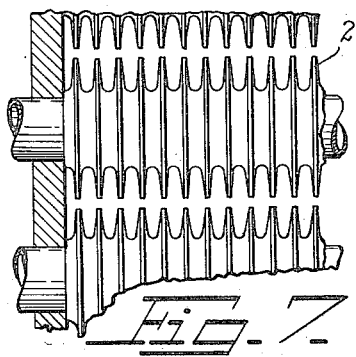

2,031,422

UNITED STATES PATENT OFFICE

2,031,422

POWER PLANT

James Slack Malseed, Brooklyn, N. Y., John Thomas Welsh, Ridgeway, Pa., and Walter Francis Keenan, Jr., Pelham Manor, N. Y., assignors to Foster Wheeler Corporation, New York, N. Y., a corporation of New York Application March 15, 1929, Serial No. 347,434
Renewed September 17, 1932

13 Claims. (Cl. 122—7)

Our invention relates to steam generators and more particularly to the utilization of gases of the kind generally termed waste gases. Our invention has a number of objects. One object is to provide a highly efficient steam generator utilizing waste gases as a source of heat. Another object is to efficiently utilize the exhaust gases of internal combustion engines and like engines, particularly of Diesel engines. Still another object is to provide a muffler for internal combustion engines and like engines, particularly Diesel engines, in which the heat of the exhaust gases is conserved and converted into heat of steam for use in conjunction with the power supplied by the internal combustion engines. Further objects will become apparent as the description proceeds.

The problem of muffling exhaust gases of internal combustion engines and the problem of utilizing the heat contained in such exhaust gases have been treated separately and separate devices of different characteristics have been employed to take care of these problems. We combine solutions for these problems in a single structure with all the advantages inherent in separate solutions. In accomplishing this result we provide what may be termed an exhaust chamber and, in this chamber, we provide transversely disposed boiler tubes or economizer tubes or both so designed and arranged as to give distinct spaces of expansion and contraction to be traversed by the exhaust gases, thus obtaining an efficient muffling effect. The transmission of heat of the exhaust gases into the water within the tubes aids in the obtaining of expansion and contraction of the gases. The tubes are made of corrosion resisting material to withstand the destructive effect of the sulphur content of the exhaust gases. We prefer to use straight tubes encased in cast iron members providing circular gills or fins tapering outwardly. By arranging tubes relatively closely together in rows transverse to the line of flow but spaced apart somewhat longitudinally of the line of flow, we provide distinct spaces of expansion and contraction while, at the same time, providing a corrosion resisting contact surface for the exhaust gases and, at the same time, providing an extended surface of considerable extent for transmission of heat between the exhaust gases and the boiler tubes and consequently the water to be heated.

Further objects and the nature of the invention will be more particularly pointed out with reference to the accompanying drawings forming part of this specification and showing a preferred embodiment of the invention.

In the drawings:

Fig. 1 shows a Diesel engine and a muffling boiler receiving exhaust gases therefrom;

Fig. 2 is a cross-sectional view of the boiler taken on the line 2—2 of Fig. 1;

Fig. 3 is a view of one side of the boiler;

Fig. 4 is a view of another side of the boiler;

Figs. 5 and 7 are views on larger scale of a section of the boiler; and

Fig. 6 illustrates the flow of gases past the boiler tubes.

Exhaust gases from Diesel engine 10 pass into exhaust conduit 11 which is connected to the inlet of the boiler 12. The pressure of the exhaust gases entering the boiler may vary from 2 lbs. per sq. in. above atmospheric to 2 lbs. per sq. in. below atmospheric. The exhaust gases enter the boiler at the bottom and leave at the top whence they may be conducted to a stack.

The boiler heating chamber is contained between walls 13, 14, 15 and 16. To stand up satisfactorily under the severe pulsations of pressure of the exhaust gases, the walls are made of substantial construction. Walls 15 and 16 are made of heavy cast iron and are ribbed with heavy ribs 17. Walls 13 and 14 are made of heavy plating.

Economizer tubes 18 and boiler tubes 19 extend transversely of the gas chamber. In the particular boiler shown there are two rows of economizer tubes at the top and four rows of boiler tubes below the economizer tubes. The tubes are composed of straight steel pipes encased in cast iron members 20. As shown in Fig. 5, the cast iron members provide a multitude of outwardly tapering fins or gills. These members may be made in a number of ways. Preferably separate rings or groups of rings are shrunk onto the pipes and fitted together with dovetail joints. The arrangement is such that the pipes are completely surrounded and encased by the cast iron members.

The tubes of each horizontal row or bank are spaced close together, so close that the fins almost contact each other. The rows of tubes are spaced farther apart than the adjacent tubes within individual rows. This provides distinct restrictions in the path of flow of the gases (Figs. 6, 7). Gases flowing through the boiler chamber are successively restricted and expanded. With the close spacing of tubes in the rows, the minimum cross-sectional area is relatively small compared to the maximum cross-sectional area between rows of tubes. Furthermore the tubes of adjacent rows are staggered in order to break up the gas flow and cause a tortuous passage for the gases.

Water is supplied to the boiler by means of conduit 22, passes in series through the economizer tubes 18 and thence through conduit 23 into steam and water drum 24 which is arranged outside the heating chamber and transversely of the tubes. The economizer tubes are connected by means of U-bends outside the gas chamber and encased in insulation within casings 26.

Water flows from drum 24 down through two side connections 27, T connections 28 and connections 29 into manifold 30 extending the width of the boiler at the height of the lowest row of tubes. T connections 28 are arranged below manifold 30 and connections 29 are bent upwardly to connect to the manifold. From manifold 30, the water flows in parallel to all the individual tubes of the lowest row, thence in parallel successively through individual tubes of the other rows and through connections 31 into the bottom of the steam and water drum. U-bends outside the walls in casings 26 connect vertically disposed boiler tubes in series. As there are twelve tubes to a row, and four rows of boiler tubes in the embodiment shown, there are twelve groups of four tubes each connected in series between the manifold and the steam and water drum.

The tubes are made of U-bend units, each unit having a plate 33 arranged thereon at the bent end. Plates 33 are of various shapes as shown in Fig. 4 and together constitute wall 13. The tubes are expanded into wall 14 and have flanges 34 at the ends outside wall 14 for connection to U-bends 32. Plates 33 are held by the tubes. Ribs 34 on plates 33 bear against the tube bends 25 and serve to determine the position of the plates to build up wall 13. Tightness at this side of the chamber is obtained by tightness of casing 26 enclosing the tube bends.

While it is preferable that all the parts coming in contact with the exhaust gases be of cast iron, it is more practical to make wall 14 of steel in order to facilitate manufacture. The tubes pass through drilled holes in this sheet and are expanded thereinto to obtain tightness and to support the tubes. This plate can be made so heavy, for example over an inch thick, as to permit corrosion thereof without injury to the boiler.

It will be seen that by the arrangement above described it is in reality easy to maintain gas tightness of the boiler chamber. This is facilitated by the horizontal arrangement of tubes and by the arrangement of vertical series connection. In an ordinary boiler fired by coal or the like, the combustion chamber and flue gas passages are under vacuum and if there is a leakage it is into this space and is objectionable only because of its adverse effect on efficiency but any such leakage would not create a nuisance or affect the atmosphere in any way around the boiler. Where, as in the case at hand, the gas pressure is at times above atmospheric, gas leaks can not be permitted. In our construction each side of the heating chamber is made tight as above explained and the corners are tightly secured together.

Between flange 37 at the bottom of each connection 27 and T connection is an orifice plate 38 having an orifice in the same constituting the smallest cross-section of water flow in the boiler. This restricts flow of water to the boiler so as to supply water only slightly in excess of the amount of steam generated and prevents back flow through the boiler elements. Furthermore by having connection 29 bent upwardly toward manifold 30, reverse flow of steam is prevented because the steam would have to travel downwardly from the boiler elements to pass up the connections 27.

We prefer to connect the steam connections 31 to the steam and water drum at the bottom to provide a slight down flow of water on the surface of connections 31 against the upflow of the steam generated which augments the normal supply to the generating tubes through connections 27 and because the steam flow bubbling up through the water in the steam and water drum maintains this water at steaming temperature so that when it is fed to the lower tubes it is ready to flash into steam the instant any heat is added and no addition of sensible heat to the water in the tubes is necessary. This stabilizes the circulation through the boiler.

The economizer is placed at the exhaust gas outlet in order to reduce the temperature of the gases to a minimum and to act as a spark arrester by materially cooling down the gases. Diesel and other engines intermittently discharge sparks which settle on canvas and other flamable materials. By passing them over cold economizer tubes these sparks are cooled to the point where they will not set fire to material on which they light. The economizer by producing greater average mean temperature differences and what might be described as partial counter-flow of gas and water through the muffler increases the heat absorbing capacity of the system.

It will be noted that the greatest heat absorption is at the places of smallest area of gas travel whereby the heat absorption aids in the muffling effect.

Steam is taken off from the drum through connection 39 and may be put to any suitable use. When our invention is applied to ships, the steam may be used to drive auxiliaries and for heating, cooking and other miscellaneous purposes. In event it is found that additional muffling effect is desired over that produced by our novel boiler, a known type of muffler not embodying a boiler may be added. Such muffler will be of smaller size than if no boiler were used by an amount determined by the effectiveness of the boiler as a muffler. Obviously this and other modifications and additions do not cause a departure from the spirit or scope of the invention.

What we claim is:

1. An exhaust muffler comprising wall structure forming a gas tight chamber and a plurality of spaced rows of tubes containing water disposed transversely to the flow of gases through said chamber having outwardly tapering cast iron fins thereon, joints between said tubes outside said wall structure, adjacent tubes of a row being so closely spaced that the fins are almost in contact to provide a series of restrictions between said fins to deflect the flow of gas, and said tubes and wall structure being so arranged and constructed as to prevent access of gases from said chamber to said joints.

2. A boiler adapted to be heated by corrosive waste gases comprising wall structure of corrosion-resisting material forming a gas-tight chamber, said wall structure comprising a solid metal wall apertured with circular holes, a plurality of rows of boiler tubes disposed transversely to the flow of gases through said chamber and extending at right angles to and through said solid wall, connections between said tubes including tube joints disposed only outside said solid wall and said tubes having tight fit with said solid wall to prevent access of said gases to said tube joints, a steam and water drum, connections for circulating water from said drum through said tubes and back to said drum by thermo-syphon action due to the heat of said gases and means surrounding said tubes providing an extended corrosion-resisting surface.

3. A boiler adapted to be heated by corrosive waste gases comprising wall structure of corrosion-resisting material forming a gas-tight chamber, said wall structure comprising a solid metal wall apertured with circular holes, a plurality of rows of boiler tubes disposed transversely to the flow of gases through said chamber and extending at right angles to and through said solid wall, connections between said tubes including tube joints disposed only outside said solid wall and said tubes having tight fit with said solid wall to prevent access of said gases to said tube joints, a steam and water drum, connections for circulating water from said drum through said tubes and back to said drum by thermo-syphon action due to the heat of said gases and a plurality of fins of corrosion-resisting material on said tubes.

4. A boiler adapted to be heated by corrosive waste gases comprising wall structure of corrosion-resisting material forming a gas-tight chamber, said wall structure including a solid metal wall apertured with circular holes, a plurality of rows of boiler tubes disposed transversely to the flow of gases through said chamber and extending at right angles to and through said solid wall, connections between said tubes including tube joints outside said solid wall and said tubes having tight fit with said solid wall to prevent access of said gases to said tube joints, a steam and water drum, connections for circulating water from said drum through said tubes and back to said drum by thermo-syphon action due to the heat of said gases and means surrounding said tubes providing an extended corrosion-resisting surface, said tubes being looped at the wall opposite to said solid wall and said opposite wall comprising wall sections fitted onto the tubes.

5. A boiler adapted to be heated by corrosive waste gases comprising a gas-tight wall structure of corrosion-resisting material forming a chamber, said wall structure including a solid metal wall apertured with circular holes and an opposite sectional wall member, a plurality of rows of boiler tubes disposed transversely to the flow of gases through said chamber and extending at right angles to and through said solid wall and being looped at the opposite wall, connections between said tubes including tube joints disposed only outside said solid wall and said tubes having tight fit with said solid wall to prevent access of said gases to said tube joints, a steam and water drum, connections for circulating water from said drum through said tubes and back to said drum by thermo-syphon action due to the heat of said gases and a plurality of fins of corrosion-resisting material on said tubes.

6. A steam-producing exhaust muffler for deadening noise of pulsations of exhaust gas comprising a gas-tight wall structure forming a chamber, opposite sides thereof being parallel, said wall structure including a solid metal wall apertured with circular holes, a plurality of spaced rows of boiler tubes disposed transversely to the flow of gases through said chamber and extending at right angles to and through said solid wall, connections between said tubes including tube joints outside said solid wall and said tubes having tight fit with said solid wall to prevent access of said gases to said tube joints, a steam and water drum, connections for circulating water from said drum through said tubes and back to said drum by thermo-syphon action due to heat of said gases and a plurality of fins of corrosion-resisting material on said tubes providing a series of restrictions between said fins for muffling the gases and providing an extended surface for intensifying heat transmission from the gases to the water in the tubes, adjacent tubes of a row being so closely spaced that the fins are almost in contact.

7. A steam-producing exhaust muffler for deadening noise of pulsations of exhaust gas comprising a gas-tight wall structure forming a chamber, opposite sides thereof being parallel, said wall structure including a solid metal wall apertured with circular holes, a plurality of spaced rows of boiler tubes disposed transversely to the flow of gases through said chamber and extending at right angles to and through said solid wall, connections between said tubes including tube joints disposed only outside said solid walls and said tubes having tight fit with said wall structure to prevent access of said gases to said tube joints, a steam and water drum, connections for circulating water from said drum through said tubes and back to said drum by thermo-syphon action due to heat of said gases and means providing an irregular surface on said tubes for muffling the gases and for intensifying heat transmission from the gases to the water in the tubes.

8. A steam-producing exhaust muffler for deadening noise of pulsations of exhaust gas comprising a gas-tight wall structure forming a chamber, opposite sides thereof being parallel, said wall structure including a solid metal wall apertured with circular holes and an opposite sectional metal wall member, a plurality of spaced rows of boiler tubes disposed transversely to the flow of gases through said chamber and extending at right angles to and through said solid wall and said sectional wall member, connections between said tubes including tube joints outside said solid wall and said tubes having tight fit with said solid wall to prevent access of said gases to said tube joints and being looped outside the opposite wall member, a steam and water drum, connections for circulating water from said drum through said tubes and back to said drum by thermo-syphon action due to heat of said gases and a plurality of fins of corrosion-resisting material on said tubes providing a series of restrictions between said fins for muffling the gases and providing an extended surface for intensifying heat transmission from the gases to the water in the tubes, adjacent tubes of a row being so closely spaced that the fins are almost in contact.

9. An exhaust muffler comprising wall structure forming a corrosion-resistant gas flue or passage traversed by corrosion-resistant tubular muffling elements disposed transversely to the line of flow of gases in said flue or passage and having irregular surfaces providing muffling restrictions, irregular surfaces of transversely adjacent tubular elements being almost in contact, joints between said tubular elements outside said wall structure, some of said tubular muffling elements constituting boiler tubes and others thereof constituting feed water heating tubes, said feed water heating tubes being disposed behind and parallel to the boiler tubes in the line of flow of gases, and said wall structure and tubular elements and joints being so constructed and arranged as to prevent access of gas from the flue or passage to the joints.

10. A steam-producing exhaust muffler for deadening noise of pulsations of exhaust gas comprising wall structure including opposite parallel vertical walls and enclosing a heating chamber, a plurality of horizontal boiler tubes extending at right angles to and through said parallel walls, a steam and water drum, downflow and upflow connections between said drum and said tubes outside said chamber, said tubes being connected to said downflow and upflow connections outside said chamber, said tubes having tight fit with said wall structure and said wall structure being constructed to prevent access of gases from the heating chamber to the tube connections, and fins of corrosion-resisting material encasing said tubes in said heating chamber, transversely adjacent tubes being so closely spaced that the fins are almost in contact.

11. An exhaust muffler for deadening noise of pulsations of exhaust gas comprising a gas-tight wall structure forming a chamber, said wall structure including a solid metal wall apertured with circular holes and an opposite sectional metal wall member, a plurality of tubes disposed transversely to the flow of gases through said chamber and extending at right angles to and through said solid wall and said sectional wall member, connections between said tubes including tube joints, all said tube joints being outside said solid wall and said tubes having tight fit in said holes with said solid wall to prevent access of said gases to said tube joints, and said tubes being looped outside the opposite wall member, and a plurality of fins of corrosion-resisting material on said tubes providing a series of restrictions between said fins for muffling the gases and providing an extended heat transfer surface, some of said tubes being so closely spaced that the fins are almost in contact.

12. A steam-producing exhaust muffler for deadening noise of pulsations of exhaust gas comprising a gas-tight wall structure forming a chamber, said wall structure including a solid metal wall apertured with circular holes, an opposite wall parallel to said solid wall and lateral walls at right angles to the solid wall, said chamber being provided with an inlet and an outlet for flow of gas therethrough in direction generally parallel to said walls, a plurality of spaced rows of boiler tubes disposed transversely to the flow of gases through said chamber and extending at right angles to and through said solid wall, connections between said tubes including tube joints outside said solid wall and said tubes having tight fit with said solid wall to prevent access of said gases to said tube joints, a steam and water drum, connections for circulating water from said drum through said tubes and back to said drum by thermo-syphon action due to heat of said gases and a plurality of fins of corrosion-resisting material on said tubes providing a series of restrictions between said fins for muffling the gases and providing an extended surface for intensifying heat transmission from the gases to the water in the tubes, adjacent tubes of a row being so closely spaced that the fins are almost in contact.

13. A boiler adapted to be heated by corrosive waste gases comprising wall structure of corrosion-resisting material forming a gas-tight chamber, said wall structure comprising a vertical solid metal wall apertured with circular holes, a plurality of rows of boiler tubes disposed transversely to the flow of gases through said chamber and extending at right angles to and through said solid wall, connections between said tubes including tube joints disposed only outside said solid wall and said tubes having tight fit with said solid wall to prevent access of said gases to said tube joints, a steam and water drum, connections for circulating water from said drum through said tubes and back to said drum by thermo-syphon action due to the heat of said gases including a member having a restricted orifice in the path of flow of water from the drum to the tubes and means surrounding said tubes providing an extended corrosion-resisting surface.

JAMES SLACK MALSEED.
JOHN THOMAS WELSH.
WALTER FRANCIS KEENAN, Jr.